3,192,298
Patented June 29, 1965

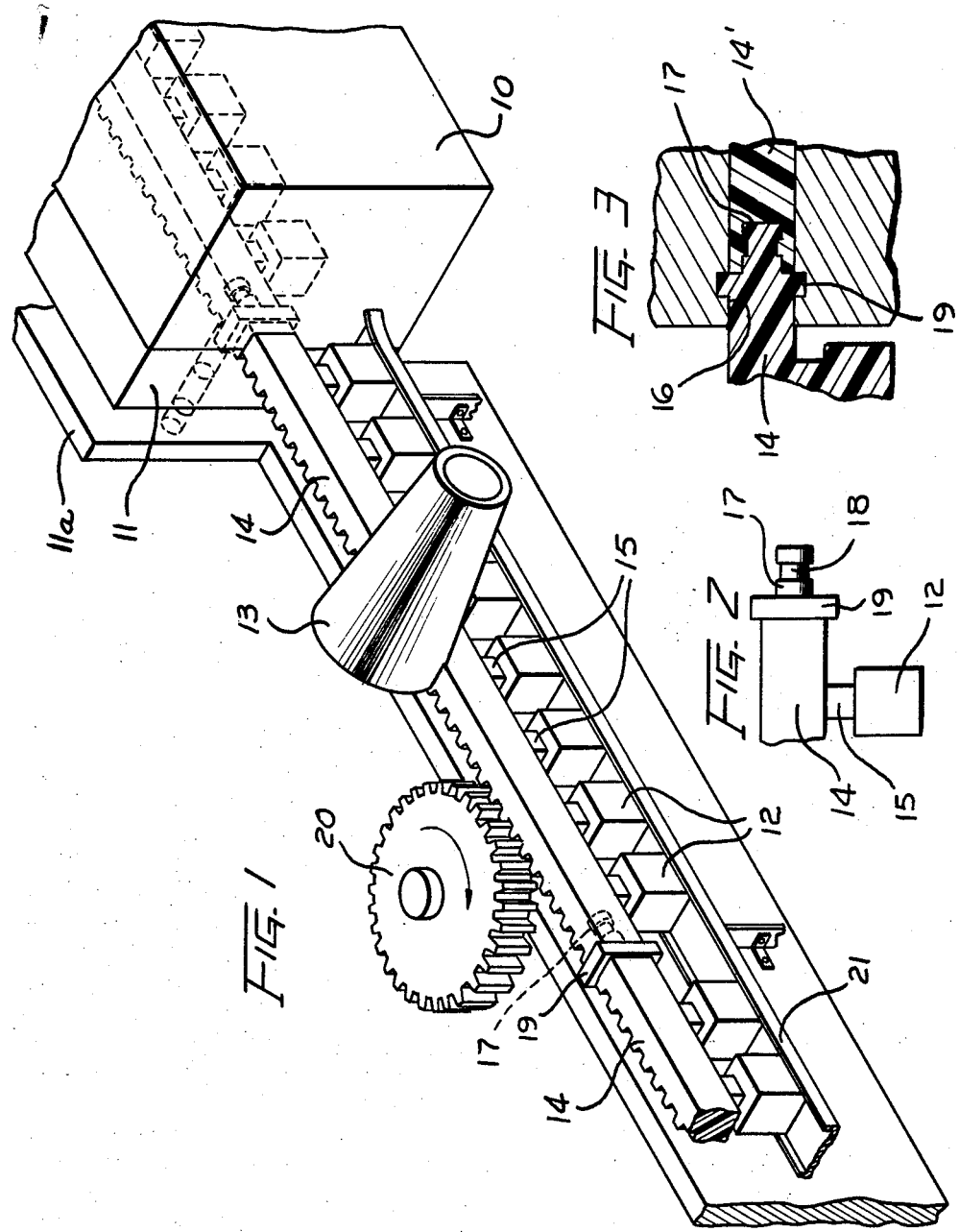

3,192,298
METHOD OF MOLDING
Everett H. Fisher, Shirley, Ind., assignor to Western Electric Company, Incorporated, a corporation of New York
Filed July 24, 1961, Ser. No. 126,029
2 Claims. (Cl. 264—294)

This invention relates to a method of molding, and more particularly to a method of molding an article of indefinite length through the joining of successively molded portions of the article. It is an object of the invention to provide an improved method of such character.

In the molding of small parts in large quantities, it is conventional to mold a predetermined number of articles in a single operation of a mold, after which the group of articles may be handled as a unit by virtue of their being connected together through scrap runners. The articles may, for example, be removed from the mold as a unit and may, if desired, continue to be handled as a unit in subsequent operations. By virtue of this, the cost of handling any given quantity of the articles is substantially reduced as compared to the cost of handling individual articles. Nevertheless, the articles are still handled in a batch process rather than in a continuous process. Furthermore, the handling of a group of articles through manipulation of a common runner or runner system does not lend itself to accurate placement of the articles for operations to be performed thereon. One such operation consists of the ultimate separation of the articles from the runner system. Where a group of articles is tied together through a runner system, it is generally necessary that the articles be separated from the runner system manually. Accordingly, the very operation of the removing of the articles from the runner system, which aids in some ways in the handling of that group of parts, requires, of itself, additional manual handling of the individual articles.

It is another object of the invention to provide an improved method of molding which permits continuous rather than batch handling of the molded product although involving sequential molding.

It is still another object of the invention to provide an improved method of molding whereby successively molded articles are arranged in a continuous molding of indefinite length.

It is a further object of the invention to provide an improved method of molding which permits the continuous handling of the molded product in the separation of the molded articles from a connecting runner.

Another object of the invention is to provide an improved method of molding having various of the characteristics specified above while being efficient, reliable and economical.

According to the present invention each successive molding is removed from its mold and advanced in such a manner that a small portion of the molding extends through an opening in the mold at the parting line thereof and lies within the mold cavity. The next molding is thereby connected to the last molding such that a continuous molding is formed.

In a preferred application of the invention, a plurality of articles are molded during each successive molding operation, the group of articles being connected by a scrap runner. Following each successive molding operation, the runner and its connected articles are removed from the mold cavity and are advanced such that only a small portion of the runner remains in the mold cavity to be connected to the runner of the next molding. This produces a runner of indefinite length with an indefinite number of molded articles secured thereto.

Preferably, such a runner is molded to the form of a rack such that a portion of the continuous runner which has been advanced to a position outside the mold cavity may be engaged by a gear or pinion. Intermittent rotation of the pinion during the periods of time when the mold is opened causes the advancement of the continuous molding. While the molded articles are thus secured to the scrap runner they may be subjected to various operations including the separation of the articles from the runner.

This invention, together with further objects and advantages thereof, will best be understood by reference to the following description taken in connection with the accompanying drawing, in which:

FIG. 1 is a perspective view illustrating one application of the invention;

FIG. 2 is an enlarged partial view of the end portion of a runner and a single molded article, and FIG. 3 is a cross-sectional view showing the leading end of a last molded runner portion and the trailing end of the previously molded runner portion in their proper position within a mold.

As indicated above, the present invention is particularly applicable to the successive molding of articles secured to a scrap runner and it is shown in the drawing and described below in such an application. It will be appreciated, however, that the invention is not limited to such an application but is of broad applicability.

Successive portions of the continuous molding are formed by successive moldings within a mold having separable mold portions 10 and 11. In each successive injection molding operation, a plurality of molded articles 12 are formed (for example eight) along with a sprue 13, a runner 14 and branch runners or gates 15.

Each time that the mold portions 11 and 12 open to release the freshly molded combination of sprue, runners and articles, the entired molded product is advanced to the left to such a position that the trailing end of the runner extends through an opening 16 in the wall of the mold along the parting line and into the mold cavity. With the mold again closed, another molding may be formed, connected to the previous molding.

Referring to FIG. 2, it will be seen that the trailing end of the runner 14 is provided with a stub portion 17 of reduced dimensions. This permits the next runner 14', see FIG. 3, to be formed about the trailing stub portion of the preceding runner 14. Still further, the stub portion 17 has an annular recess 18 therein such that a mechanical interlock is effected between each two successive runners. The runner 14 is preferably provided with a flange 19 receivable within an annular groove in the mold to resist the outward thrust of the material injected into the mold to form the succeeding molding.

Preferably the runner 14 is molded in the form of a rack as shown in FIG. 1 such that an intermittently rotating pinion 20 may advance the runner and associated molded parts a prescribed distance during the successive periods of time when the mold is opened. A chute or track 21 may also be provided for supporting the continuous molded product and guiding it along the desired path.

Preferably, both mold halves 10 and 11 move to open, and an ejector plate 11a remains stationary such that the molded article remains stationary throughout the opening of the mold. This permits use of a stationary track 21 and pinion 20. Alternatively, however, any other portion of the apparatus may remain stationary. If, for example, the mold half 10 is to be stationary, the ejector plate 11a may at first move with the mold half 11 and then stop while the mold half 11a continues to withdraw. In this case, the track 21 and the pinion 20 should be mounted for movement with the ejector plate as is suggested in FIG. 1.

It may now be seen that with the molded product thus formed as a continuous article and with this continuous molding guided by the track 21 and accurately advanced by the pinion 20 in cooperation with the rack teeth formed on the runner 14, the molded product, and in particular the molded articles 12, may be advanced accurately to operating stations at which various desired operations may be performed thereon. Such operations may include the performing of machining operations such as the drilling of holes, finishing of the articles as by coating or grinding, and, finally, the separation of the articles from the runner 14 and/or the branch runners or gates 15. A still further operation on the runner itself desirably includes the separation of lengths of this runner from the continuous runner as fed from the mold to the pinion 20.

While the invention has been illustrated in the drawing and described above as applied to the successive molding of a group of articles with an interconnecting scrap runner, it will be apparent that the invention is equally applicable to the forming of a continuous article having no scrap portion. Such a molded article might be of uniform cross section as in the case of extrusion, but it may also be of irregular cross section as is well illustrated in the above-described application of the invention.

It may now be seen that the method comprising the present invention permits the continuous handling of a molded product which is molded in a succession of discrete operations. It also facilitates handling of the molded product automatically such that individual molded articles or groups of molded articles of limited number need not be handled manually. Still further, it will be appreciated by those skilled in the art that the method is efficient, reliable and economical. As opposed to conventional extrusion methods, it permits the formation of a continuous article of pronouncedly varying cross section.

While one embodiment of the invention has been disclosed, many modifications will be apparent, and it is intended that the invention be interpreted as including all modifications which fall within the true spirit and scope of the invention.

What is claimed is:

1. The method of molding an article of indefinite length which comprises:

repeatedly molding successive portions of the article within a mold having an access opening along the parting plane thereof, the article as molded being provided with alternate protrusions and recesses spaced uniformly along the length of the article for convenient engagement by article advancing means so as to facilitate advancement of the article in desired synchronism and phase relationship with respect to the mold and its operation;

opening the mold;

moving the last molded portion of the article to a position wherein it fills the access opening with a lesser part thereof extending into the cavity of the mold, whereby each newly molded portion of the article is made to be substantially integral with the last molded portion thereof.

2. The method of molding an article of indefinite length which comprises:

repeatedly molding successive portions of the article within a mold having an access opening along the parting plane thereof, the article as molded being provided with a rack integral therewith and extending the length of said article for convenient engagement by an article advancing pinion so as to facilitate advancement of the article in desired synchronism and phase relationship with respect to the mold and its operation;

opening the mold;

moving the last molded portion of the article to a position wherein it fills the access opening with a lesser part thereof extending into the cavity of the mold, whereby each newly molded portion of the article is made to be substantially integral with the last molded portion thereof.

References Cited by the Examiner

UNITED STATES PATENTS

| | | | |
|---|---|---|---|
| 2,197,968 | 4/40 | De Mattia | 18—30 |
| 2,234,185 | 3/41 | Marinsky et al. | 18—30 X |
| 2,266,433 | 12/41 | Morin et al. | 18—30 X |
| 2,403,739 | 7/46 | Morin | 18—30 |
| 2,908,941 | 10/59 | Sabo et al. | 18—59 |
| 2,979,776 | 4/61 | Morin. | |

ALEXANDER H. BRODMERKEL, *Primary Examiner.*

ROBERT F. WHITE, *Examiner.*